United States Patent Office 3,192,231

Patented June 29, 1965

3,192,231

UNSATURATED SUBSTITUTED CYCLIC SULFONES AND PROCESS FOR PREPARING THE SAME

Richard Parke Welcher, Old Greenwich, Conn., assignor to American Cyanamid Company, Stamford, Conn., a corporation of Maine

No Drawing. Filed Sept. 19, 1962, Ser. No. 224,859

11 Claims. (Cl. 260—332.1)

This invention relates to novel unsaturated substituted cyclic sulfones and to a process for preparing the same. In a more particular aspect, this invention relates to novel unsaturated cyclic sulfones having one to four substituent groups on the carbon atoms adjacent to the sulfur atom, that is, on the alpha carbon atoms, and to a process for preparing the same. In a still more particular aspect, this invention relates to novel unsaturated substituted cyclic sulfones of the formula:

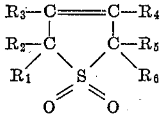

in which the substituents $R_1$, $R_2$, $R_5$ and $R_6$ are each selected from the group consisting of hydrogen, alkyl, alkenyl, aryl, alkaryl, aralkyl, cycloalkyl, cycloalkenyl, and cyanoethyl with the proviso that at least one of the $R_1$, $R_2$, $R_5$ and $R_6$ substituents is cyanoethyl and $R_3$ and $R_4$ are each selected from the group consisting of hydrogen, alkyl, alkenyl, aryl, alkaryl, aralkyl cycloalkyl, and cycloalkenyl. From the structural representation of the novel compounds of the present invention, it will be seen that the unsaturated substituted cyclic sulfones of this invention may also be described as 3-sulfolenes having at least one cyanoethyl grouping attached to the 2- or 5-nuclear carbon atom.

While aryl sulfones have been known to be capable of undergoing cyanoethylation, the cyanoethylation of unsaturated cyclic sulfones has not previously been described. While it should be mentioned that O. Bayer, Angew. Chem. 61, 229 (1949), reported the unpublished study of R. Wegler and H. Lafos of the cyanoethylation of sulfones, it is observed that the there described condensation of acrylonitrile with a typical unsaturated cyclic sulfone, i.e., butadiene sulfone, afforded not definite crystalline products but instead higher molecular weight condensation products which were recovered only upon distillation under high vacuum. Bayer concluded that the possibility of reaction of a maximum of four moles of acrylonitrile with one mole of butadiene sulfone seemed unlikely. The author further stated that it was believed that the acrylonitrile was caused to polymerize under basic conditions so as to produce, in addition to higher molecular weight products, a substance having an analysis corresponding to a ratio of three moles of acrylonitrile to one mole of butadiene sulfone, which may be possibly considered polyacrylonitrile of short chain length terminating in a diene sulfone unit. In view, therefore, of Bayer's report, it was indeed surprising and unexpected to find that unsaturated cyclic sulfones, the simplest member of the class being butadiene sulfone, could be reacted with acrylonitrile so as to readily yield unsaturated cyclic sulfones having at least one cyanoethyl substituent in either the 2- or 5-nuclear carbon position with definitely defined physical characteristics, i.e., solids having sharp melting points or, in certain cases, liquids with reproducible refractive indices, good agreement with theoretical elemental analysis and theoretical molecular weight, etc.

In accordance with the present invention, it has been discovered that novel unsaturated substituted cyclic sulfones having the formula as defined hereinabove may be readily prepared by reacting in the presence of an alkaline condensing agent acrylonitrile and an unsaturated cyclic sulfone of the formula:

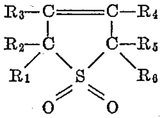

in which $R_1$ to $R_6$, inclusive, are each selected from the group consisting of hydrogen, alkyl, alkenyl, aryl, alkaryl, aralkyl, cycloalkyl, and cycloalkenyl, with the proviso that at least one of $R_1$, $R_2$, $R_5$ or $R_6$ is hydrogen. By this reaction, the 2- or 5-carbon atom or both is cyanoethylated. Thus, the novel compounds of this invention may contain one, two, three or four cyanoethyl ($CH_2CH_2CN$—) groups depending upon the absence of hydrocarbon substituents as values for $R_1$, $R_2$, $R_5$ and $R_6$ in the starting sulfone. The only critical limitation in the carrying out of the process for producing the novel compounds of this invention is that functional groups should not be present on the $R_1$ to $R_6$, inclusive, substituents of the starting sulfone which would undergo side reactions either with the basic catalyst or with acrylonitrile itself. Thus, substituents for $R_1$ to $R_6$, inclusive, containing halogen atoms, carbonyl groups and the like are precluded.

For effecting cyanoethylation of the unsaturated cyclic sulfones, alkaline condensing agents of a broad class may be readily employed. Thus, oxides, hydroxides, amides, hydrides or alcoholates of the alkali metals or the alkali metals themselves or strongly basic quaternary ammonium hydroxides may be used. Also, organic bases, such as heptamethylbiguanide, which are themselves not attacked by acrylonitrile may also be used. Typical condensing agents are sodium or potassium oxide, sodium hydroxide, potassium hydroxide, lithium hydroxide, sodium amide, potassium hydride, potassium ethylate, benzyl trimethyl ammonium hydroxide, dibenzyl dimethyl ammonium hydroxide or the like. Generally, small amounts of such alkaline condensing agents are required, about 1 to 10 mole percent of the unsaturated cyclic sulfone usually being sufficient.

If desired, the cyanoethylation reaction may be carried out in the presence of a solvent which is inert or which is less reactive with acrylonitrile than the unsaturated cyclic sulfone. Ordinarily, the use of a solvent is preferred. Typical solvents which serve as suspending media, diluents or actual solvents for the reactants and alkaline condensing agent are aromatic hydrocarbons such as benzene, toluene and the like, dioxane, dimethylformamide, tertiary butyl alcohol, acetonitrile, etc. Usually, acetonitrile is the solvent of choice.

In order to forestall possible polymerization of acrylonitrile during the course of the reaction, a polymerization inhibitor such as tertiary butyl catechol, hydroquinone, naphthylamine, etc. may be employed and may be added to the reaction mass together with the acrylonitrile reactant.

The reaction of an unsaturated cyclic sulfone with acrylonitrile in the presence of an alkaline condensing agent may be effected at temperatures between about −20° C. and up to about 100° C. Even higher temperatures are not precluded but such temperatures will be limited only by the boiling point of the acrylonitrile-solvent mixture. Preferably, temperatures of from about −10° C. to about 85° C. are employed. Since the cyanoethylation reaction is ordinarily exothermic, it is generally desirable to control the resulting rise in temperature by external cooling, rate of mixing or other conventional means.

The reactants need not be mixed with one another in any particular order. Thus, the unsaturated cyclic sulfone may be added to acrylonitrile or vice versa or the reactants may be simultaneously added to the reaction vessel. The condensing agent may be initially present in the reaction vessel or it may be added after the sulfone reactant has been mixed with acrylonitrile.

The molar ratio of reactants, that is, unsaturated cyclic sulfone and acrylonitrile, is generally determined by the degree of cyanoethylation desired in the final product. Thus, for the obtaining of monocyanoethyl substituted sulfones, approximately equimolecular quantities of sulfone and acrylonitrile are employed. It is frequently desirable to use an excess quantity of sulfone. Even then, however, polycyanoethylated products may be obtained in addition to the monocyanaoethylated product. When dicyanoethylated, tricyanoethylated and tetracyanoethylated products are desired, a two-fold, three-fold, or four-fold molar quantity of acrylonitrile is employed. Here again, however, cyclic sulfones having higher degrees of cyanoethylation may be obtained. In any event, either the unsaturated cyclic sulfone or acrylonitrile may be used in excess depending upon the product desired.

While the reaction is ordinarily carried out at atmospheric pressure, higher pressures are not precluded from use. Thus, elevated pressures may be employed in order to use reaction temperatures above the boiling point of the acrylonitrile-solvent mixture.

Following the completion of the reaction or when the reaction has been carried to the desired stage, it is usually recommended to destroy or remove the alkaline condensing agent by neutralizing it, extracting it, or otherwise disposing of it. The reaction product is then isolated in a conventional manner, for example, by filtration, distillation of solvent, selective extraction, selective adsorption or the like.

Any of a broad class of unsaturated cyclic sulfones, unsubstituted and substituted, may be employed in the process of this invention. Such sulfones are sometimes commonly referred to as 3-sulfolenes, that ia, a five-membered ring of four carbon atoms and a sulfur atom with a single olefinic linkage between the two and three carbon atoms of said ring and two oxygen atoms, both of which are attached directly to the sulfur atom therein. In addition to being describd as 3-sulfolenes, th unsaturated cyclic sulfones suitable for use in the process of this invention may be also described in accordance with another type of monenclature. Thus, the simplest sulfone, butadiene sulfone, is named 1:1-dioxythiacyclopent-3-ene. Such unsaturated cyclic sulfones are readily obtained by the reaction of sulfur dioxide with butadiene and its homologs and analogs. Butadiene, its homologs or analogs all of which may be described by the formula:

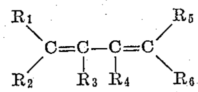

in which the substituents $R_1$ to $R_6$, inclusive, are as defined hereinabove for the starting sulfones may be converted to the corresponding cyclic sulfones by reaction with sulfur dioxide in a known manner. In addition to butadiene-1,3-, the simplest diene reactant, other aliphatic polyolefins which afford unsaturated cyclic sulfones suitable for use in this invention include 2-methyl butadiene-1,3 (isoprene); pentadiene-1,3 (piperylene); 1,3-dimethyl butadiene-1,3; 2,3-dimethyl butadiene-1,3; 2,3-diethyl butadiene-1,3; 2,3-ditertiary-butyl butadiene-1,3; 2-tertiary-butyl butadiene-1,3; 1,2,3,4-tetramethyl butadiene-1,3; 1,4-dimethyl-2,3-diethyl butadiene-1,3; 2-methyl pentadiene-1,3; 4-methyl pentadiene-1,3; 2-methyl hexadiene-1,3; 4-ethyl hexadiene-1,3; hexadiene-2,4; and the like and their homologs and analogs. The straight chain polyolefins of the class described above may also have alkenyl, cycloalkyl, cycloalkenyl and/or aromatic radicals linked to carbon atoms of primary, secondary and/or tertiary character, examples of such compounds being cyclopentyl butadienes; cyclopentenyl butadienes; cyclopentyl pentadienes; cyclohexyl butadienes; cyclohexenyl butadienes; 1-phenyl butadiene-1,3; 1,2-diphenyl butadiene-1,3; 2-phenyl butadiene-1,3; 2,3-diphenyl butadiene-1,3; hexatriene-1,3,5; and the like and their homologs and analogs. Thus, typical sulfones useful in the process of this invention are included in the following non-limiting listing: butadiene sulfone, piperylene sulfone, isoprene sulfone, 2,4-hexadiene sulfone, 2-ethyl butadiene-1,3 sulfone, 2-methyl-pentadiene-1,3 sulfone, and their homologs, as well as other sulfone compounds in which hydrocarbon radicals, such as methyl, ethyl, vinyl, propyl, isopropyl, propenyl, allyl, isopropenyl, butyl, isobutyl, butenyl, isobutenyl, pentenyl, amyl, hexyl, isohexyl, isohexenyl, cyclobutyl, cyclopentyl, cyclohexyl, cyclopentenyl, cyclohexenyl, phenyl, benzyl, tolyl, xylyl and other like radicals are substituted for one or more of the hydrogen atoms of the unsubstituted cyclic sulfone compounds.

The unsaturated substituted cyclic sulfones of this invention are particularly useful in the production of synthetic resinous materials. In addition, the compounds are of value as plasticizers for various polymeric materials, for example, homopolymers and copolymers of acrylonitrile and the like. The compounds may be pyrolyzed to yield substituted 1,3-butadienes which are described and claimed in my copending application Serial No. 224,861, filed concurrently herewith.

In order to further illustrate the nature of this invention, the following non-limiting examples are presented.

*Example 1*

A solution of 11.8 parts (0.100 mole) of butadiene sulfone, 23.3 parts (0.440 mole) of acrylonitrile and 20 parts of acetonitrile is added to a mixture of 2 parts of Triton B (benzyltrimethylammonium hydroxide, 40% in methyl alcohol) in 20 parts of acetonitrile dropwise over a period of 1.2 hours at 0–7° C. The mixture, after warming to 25° C., is neutralized with acetic acid and filtered. After recrystallization from acetonitrile the 2,2,5,5-thiophenetetrapropionitrile-1,1-dioxide melts at 209.5–210° C., decomposing with evolution of gas.

*Analysis.*—Calculated for $C_{16}H_{18}N_4O_2S$: C, 58.16; H, 5.49; N, 16.96; S, 9.70. Found: C, 58.40; H, 5.72; N, 17.53; S, 9.57.

Its infrared spectrum is consistent with the postulated structure.

*Example 2*

The procedure of Example 1 is repeated in all essential respects except that 10.6 parts (0.200 mole) of acrylonitrile is used. A small amout of insoluble 2,2,5,5-thiophenetetrapropionitrile-1,1-dioxide and a mixture of 2,2-thiophenedipropionitrile-1,1-dioxide and 2,2,5-thiophenetripropionitrile-1,1-dioxide are obtained. The three products are separated by selective extraction.

*Example 3*

The procedure of Example 1 is repeated in all essential respects except that 5.3 parts (0.100 mole) of acrylonitrile is used. 2-thiophenepropionitrile-1,1-dioxide is obtained.

*Example 4*

The procedure of Example 1 is repeated in all essential respects except that isoprene sulfone is employed in place of butadiene sulfone. 3-methyl-2,2,5,5-thiophenetetrapropionitrile-1,1-dioxide is obtained.

*Example 5*

The procedure of Example 1 is repeated in all essential respect except that piperylene (2,4-pentadiene) sulfone is employed in place of butadiene sulfone and 15.9 parts (0.300 mole) of acrylonitrile is used. 2-methyl-2,5,5-thiophenetripropionitrile-1,1-dioxide is obtained.

*Example 6*

The procedure of Example 1 is repeated in all essential respects except that 2,4-hexadiene sulfone is employed in place of butadiene sulfoneand 10.60 parts (0.200 mole) of acrylonitrile is used. 2,5-dimethyl-2,5-thiophenedipropionitrile-1,1-dioxide is obtained.

*Example 7*

The procedure of Example 1 is repeated in all essential respects except that 1,4-diphenylbutadiene sulfone is employed in place of butadiene sulfone and 10.6 parts (0.200 mole) of acrylonitrile is used. 2,5-diphenyl-2,5-thiophenedipropionitrile-1,1-dioxide is obtained.

*Example 8*

The procedure of Example 1 is repeated in all essential respects except that 2,3-diphenylbutadiene sulfone is emploed in place of butadiene sulfone. 3,4-diphenyl-2,2,5,5-thiophenetetrapropionitrile-1,1-dioxide is obtained.

While the present invention has been described in conjunction with various preferred embodiments, it is to be understood that the invention is not be limited to such exemplary description but is to be construed broadly and limited only by the following claims.

I claim:

1. An unsaturated substituted cyclic sulfone of the formula:

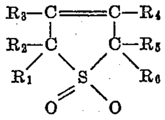

in which $R_1$,$R_2$, $R_5$ and $R_6$ are each selected from the group consisting of hydrogen, lower alkyl, phenyl and cyanoethyl with the proviso that at least one of the $R_1$, $R_2$, $R_5$ and $R_6$ substituents is cyanoethyl and $R_3$ and $R_4$ are each selected from the group consisting of hydrogen, lower alkyl and phenyl.

2. A process for preparing an unsaturated substituted cyclic sulfone of the formula:

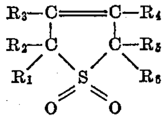

in which $R_1$, $R_2$, $R_5$ and $R_6$ are each selected from the group consisting of hydrogen, alkyl, alkenyl, aryl, alkaryl, aralkyl, cycloalkyl, cycloalkenyl, and cyanoethyl with the proviso that at least one of the $R_1$, $R_2$, $R_5$ and $R_6$ substituents is cyanoethyl and $R_3$ and $R_4$ are each selected from the group consisting of hydrogen, alkyl, alkenyl, aryl, alkaryl, aralkyl, cycloalkyl, and cycloalkenyl which comprises mixing acrylonitrile and an unsaturated cyclic sulfone of the formula:

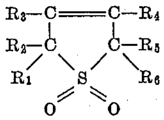

in which $R_1$ to $R_6$, inclusive, are each selected from the group consisting of hydrogen, alkyl, alkenyl, aryl, alkaryl, aralkyl, cycloalkyl, and cycloalkenyl with the proviso that at least one of $R_1$, $R_2$, $R_5$ and $R_6$ is hydrogen and reacting in the presence of an alkaline condensing agent.

3. A process as in claim 2 in which the temperature of reaction is from about —20° C. to about 100° C.

4. A process as in claim 3 in which the alkaline condensing agent is a quaternary ammonium hydroxide.

5. A process for preparing 2,2,5,5-thiophenetetrapropionitrile-1,1-dioxide which comprises reacting butadiene sulfone with acrylonitrile in the presence of an alkaline condensing agent.

6. 2,2,5,5-thiophenetetrapropionitrile-1,1-dioxide.

7. 2,5 - dimethyl-2,5-thiophenedipropionitrile-1,1-dioxide.

8. 2,5 - diphenyl-2,5-thiophenedipropionitrile-1,1-dioxide.

9. 3 - methyl-2,2,5,5-thiophenetetrapropionitrile-1,1-dioxide.

10. 2-thiophenepropionitrile-1,1-dioxide.

11. A process as in claim 2 in which the reaction is conducted in an acetonitrile medium.

References Cited by the Examiner

Asthema et al.: Jour. Indian Chem. Soc., Vol. 31 (1954), pages 459 and 460.

Bayer: Angew. Chemie, Vol. 61, No. 6 (1949), page 238.

Bruson: Organic Reactions, Wiley and Sons, New York, Vol. 5 (1949), pages 80 and 81.

IRVING MARCUS, *Primary Examiner.*

NICHOLAS S. RIZZO, WALTER A. MODANCE, *Examiners.*